No. 831,784. PATENTED SEPT. 25, 1906.
C. E. FRIEL.
POTATO DIGGER.
APPLICATION FILED SEPT. 14, 1905.
2 SHEETS—SHEET 1.
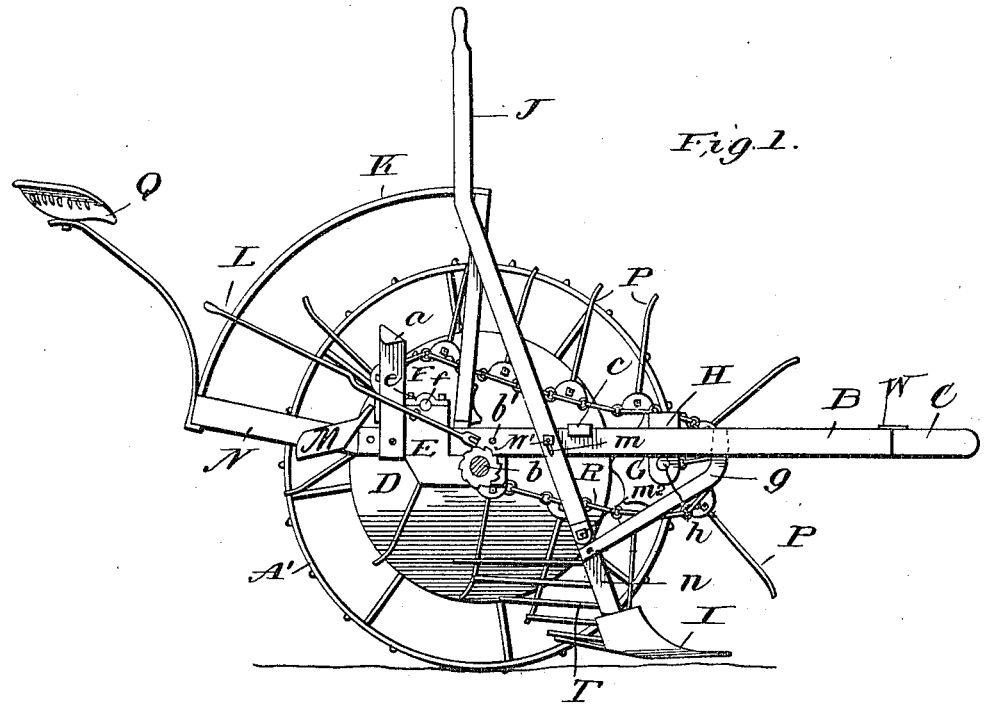
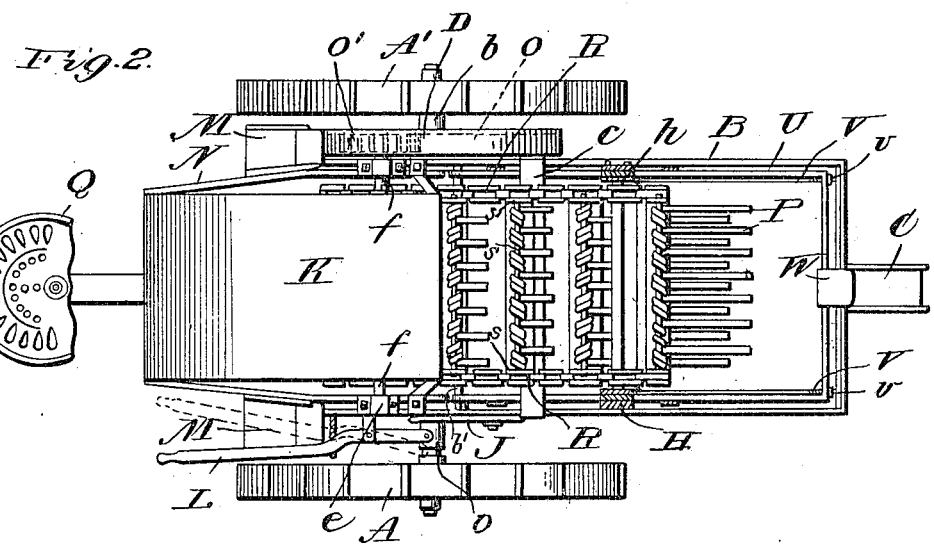
WITNESSES:
INVENTOR
Charles E. Friel
By Milo B. Stevens & Co
Attorneys No. 831,784. PATENTED SEPT. 25, 1906.
C. E. FRIEL.
POTATO DIGGER.
APPLICATION FILED SEPT. 14, 1905.

2 SHEETS—SHEET 2.

WITNESSES:

INVENTOR
Charles E. Friel
By Milo B. Stevens & Co
Attorneys.

UNITED STATES PATENT OFFICE.

CHARLES ERNEST FRIEL, OF ST. MARY'S FERRY, NEW BRUNSWICK, CANADA.

POTATO-DIGGER.

No. 831,784.       Specification of Letters Patent.       Patented Sept. 25, 1906.

Application filed September 14, 1905. Serial No. 278,434.

*To all whom it may concern:*

Be it known that I, CHARLES ERNEST FRIEL, a subject of the King of Great Britain, and a resident of St. Mary's Ferry, in the county of York, New Brunswick, Dominion of Canada, have invented new and useful Improvements in Potato-Diggers, of which the following is a specification.

My invention is a potato-digger, and more particularly a machine of this kind consisting in a wheeled frame carrying a plow or scoop which digs up the potatoes and a rake working over the plow for removing the potatoes therefrom.

The object of the invention is to provide a machine of this kind embodying certain novel features of construction to be hereinafter described and claimed.

Figure 3:
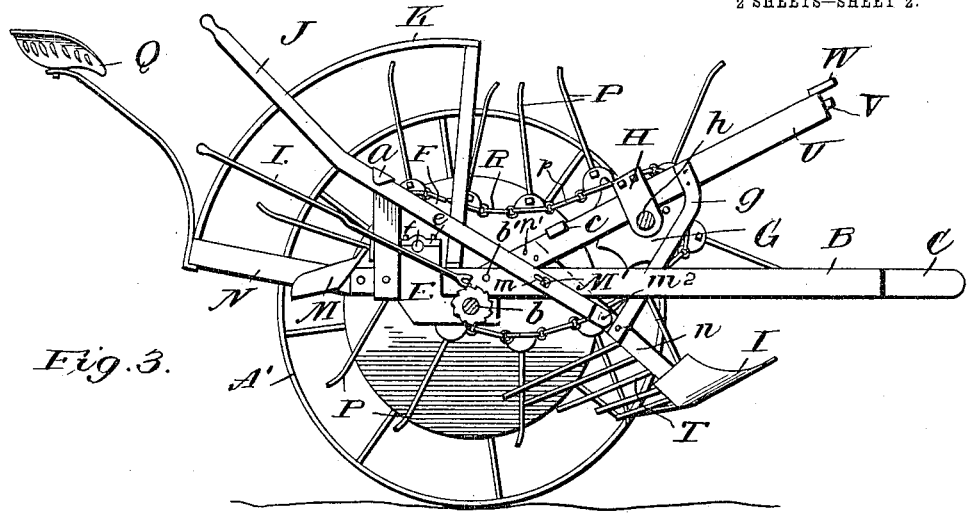
Figure 4:
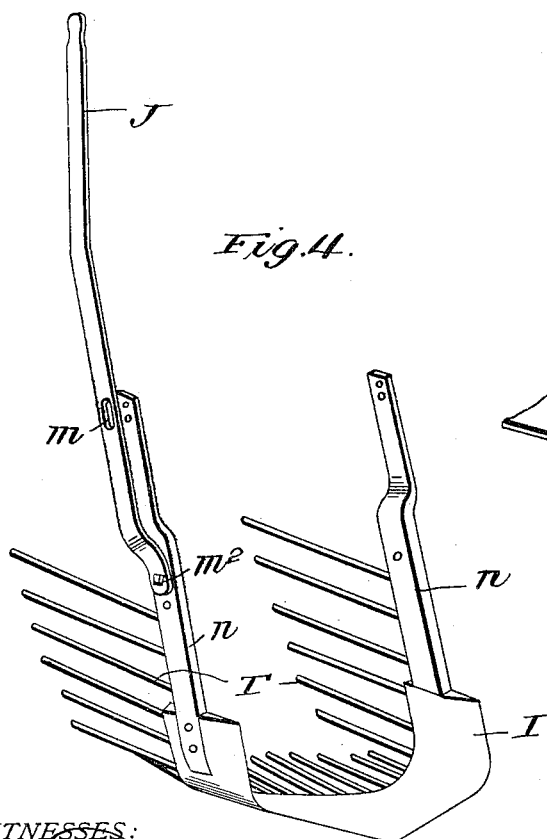
Figure 5:
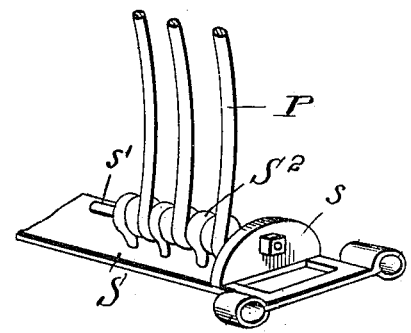
Figure 6:
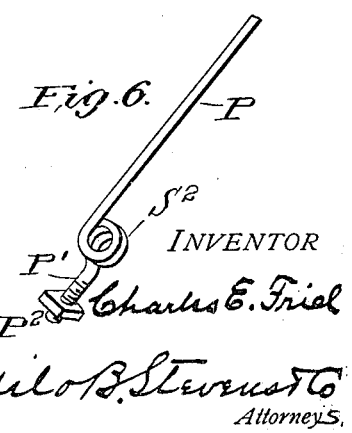

In the accompanying drawings, Figure 1 is an elevation of the machine in operative position, one of the wheels being shown removed. Fig. 2 is a plan view. Fig. 3 is an elevation of the machine in inoperative position. Fig. 4 is a detail in perspective of the plow or scoop. Figs. 5 and 6 are details showing the construction of the rake.

Referring specifically to the drawings, A A' denote the wheels, and $b$ the axle on which the main frame E of the machine is mounted. To the frame E front and rear frames B and N, respectively, are bolted. The frame B has a tongue attachment C for the draft-animals.

U denotes a swinging frame which is arranged within the frame B and mounted on a transverse shaft $b'$, carried by said frame B in front of the axle $b$. The front part of the frame U carries a projecting piece W, which engages the frame B, whereby the said frame U is supported on the frame B and prevented from dropping below the latter. The frame U is braced by a cross-bar $c$, which also extends beyond said frame and engages the frame B for the same purpose as the piece W.

I indicates the plow or scoop and is carried by hangers $n$, which are bolted to the frame U, as at $n'$. Braces $g$ extend between the hangers and the frame U. The rear end of the plow has the usual screen T.

F indicates a pair of sprockets on a shaft $f$, which is journaled in bearings $e$ on the frame E. These sprockets are connected by an endless chain carrying rake-teeth P with a pair of sprockets G on a shaft $h$, journaled in hangers H, which are mounted on the frame U and are slidable lengthwise thereon for the purpose of tightening or loosening the chain R. This adjustment is made by means of rods V, which are secured to the hangers and extend through the front part of the frame U. The outer ends of the rods are threaded to receive nuts $v$, which upon being tightened securely hold the hangers in adjusted position.

The chain comprises cross-bars S, which are connected by links P. Near the ends of the cross-bars S are flanges $s$, which are connected by cross-rods $s'$. The shanks of the rake-teeth P are threaded, as at P', and extend through holes in the cross-bars S, to which they are fastened by nuts P². The teeth are rendered springy or elastic by coiling them, as at $s^2$, through which coils the rods $s'$ extend.

The rake is operated by an internal gear O on the axle $b$ and driven from the wheel A. The gear O meshes with a pinion O' on the shaft $f$. A suitable clutch mechanism $o$, operated by a hand-lever L, is provided for throwing the machine into and out of gear. The gear O and pinion O' are inclosed by a housing D.

The plow I is raised and lowered by swinging the frame U on the shaft $b'$. This is done by a hand-lever J, which is pivoted, as at M', to the frame B and connected, as at $m^2$, to one of the hangers $n$ of the plow. The pivot M' works in a slot $m$ in the hand-lever. Upon swinging the hand-lever rearwardly the frame U swings upwardly and elevates the plow, as shown in Fig. 3. The frame is held in this position by engagement of the hand-lever with a catch $a$, carried by the frame E. To bring the plow into operative position, the hand-lever is released and the frame dropped down, as shown in Fig. 1. The parts W and $c$ prevent said frame from swinging below the frame B.

A seat Q is provided, which is carried by the frame N. Foot-rests for the driver are indicated at M. At the rear end of the machine is a housing K, which extends over the rakes for the purpose of protecting the driver from injury thereby.

In the operation of the machine the plow or scoop digs up the potatoes, and they pass rearwardly over the screen T, from which they are knocked by the rake. The potatoes are thrown rearwardly farther than the earth thrown up by the plow and fall in the furrow made by the plow.

Having thus described my invention, what is claimed as new, and desired to be secured by Letters Patent, is—

A potato-digger comprising a wheeled main frame, a shaft extending across said frame in front of the axle, a vertically-swinging frame pivotally mounted at its rear end within the main frame upon the aforesaid shaft, and having a stop engaging the main frame, a hanger depending from the main frame and carrying a plow, a hand-lever pivoted to the main frame, and connected at one end to the aforesaid hanger for elevating the swinging frame and the plow.

In testimony whereof I have signed my name to this specification in the presence of two subscribing witnesses.

CHARLES ERNEST FRIEL.

Witnesses:
J. V. MAGEE,
J. H. BARRY.